United States Patent [19]
Kreps

[11] 3,902,351
[45] Sept. 2, 1975

[54] THERMOSTATIC CONTROL CALIBRATION APPARATUS

[75] Inventor: Emmett E. Kreps, Cerritos, Calif.

[73] Assignee: Robertshaw Controls Company, Richmond, Va.

[22] Filed: Jan. 2, 1974

[21] Appl. No.: 430,358

Related U.S. Application Data

[63] Continuation-in-part of Ser. No. 185,975, Oct. 4, 1971, Pat. No. 3,783,675.

[52] U.S. Cl. ................................................ 73/1 F
[51] Int. Cl.² ........................................ G01K 15/00
[58] Field of Search ..................................... 73/1 F

[56] References Cited
UNITED STATES PATENTS

3,141,322  7/1964  Himelsbaugh ........................ 73/1 F
3,783,675  1/1974  Kreps ................................... 73/1 F Primary Examiner—S. Clement Swisher
Attorney, Agent, or Firm—Anthony A. O'Brien

[57] ABSTRACT

An apparatus calibrates a thermostatic control by adjusting a temperature selecting member to the sensed ambient temperature and then moving a settable shaft, which is frictionally engaged by the temperature selecting member, relative to the temperature selecting member, until operation of the thermostatic control is sensed. A detector is provided for detecting if the settable shaft is set between predetermined upper and lower limits. Also a moveable table is provided for conveying thermostatic controls into a calibration station in the calibration apparatus.

11 Claims, 8 Drawing Figures

THERMOSTATIC CONTROL CALIBRATION APPARATUS

CROSS REFERENCE TO RELATED APPLICATIONS

This application is a continuation in part of my application Ser. No. 185,975 filed on Oct. 4, 1971, now U.S. Pat. No. 3,783,675 issued Jan. 8, 1974, which is incorporated herein by reference.

BACKGROUND OF THE INVENTION

1. Field of the Invention

This invention relates to apparatus for calibrating thermostatic controls, and in particular, to an apparatus for setting the temperature selecting member, such as a temperature selecting dial, of thermostatic controls relative to energy flow control facilities, such as a thermostatic valve, of the controls in accordance with the temperatures to which the thermostatic controls are exposed.

2. Prior Art

In the prior art, calibration of thermostatic controls, such as the water heater valve controls shown in U.S. Pat. Nos. 2,953,937 and 3,683,304, has been accomplished with the temperature sensing element of the controls immersed in water which has a selected calibration temperature. The temperature selecting member is manually set relative to the thermostatic valve of the control to just close the valve when the temperature selecting member is moved from a higher selected temperature down to the calibration temperature. This manual calibration procedure was time consuming, requiring extensive labor costs.

Also the prior art, as exemplified in U.S. Pat. Nos. 2,724,961, 3,347,085, and 3,636,622, contains a variety of apparatus for aiding the calibration of various thermostatic devices. The prior calibrating apparatus, while capable of calibrating certain simple thermostatic devices, is incapable of calibrating other thermostatic devices, such as thermostatic valves, with any sufficient degree of reliability.

SUMMARY OF THE INVENTION

The invention is summarized in that an apparatus for calibrating a thermostatic control which has an energy flow control means, settable means responsible to an operating temperature for operating the energy flow control means, and means for selecting the operating temperature of the operating means, the apparatus comprising means for sensing a temperature to which the thermostatic control is exposed, means responsive to the apparatus temperature sensing means for adjusting the selecting means in accordance with the sensed temperature, means for moving the settable means to operate the energy flow control means, means sensing the operation of the energy flow control means for terminating the moving means to set the settable means, and means for detecting if the settable means is set between predetermined upper and lower limits.

An object of the present invention is to construct an apparatus for automatically calibrating a thermostatic control to eliminate the necessity of manually calibrating thermostatic controls.

Another object of the invention is to provide a thermostatic calibrating apparatus with facilities for detecting defective thermostatic controls.

The present invention has a further object to provide for automatically positioning thermostatic controls in the temperature calibration apparatus.

Other objects, advantages and features of the invention will become apparent from the following description taken in conjunction with the accompanying drawings.

DESCRIPTION OF THE PREFERRED EMBODIMENTS

Figure 1:
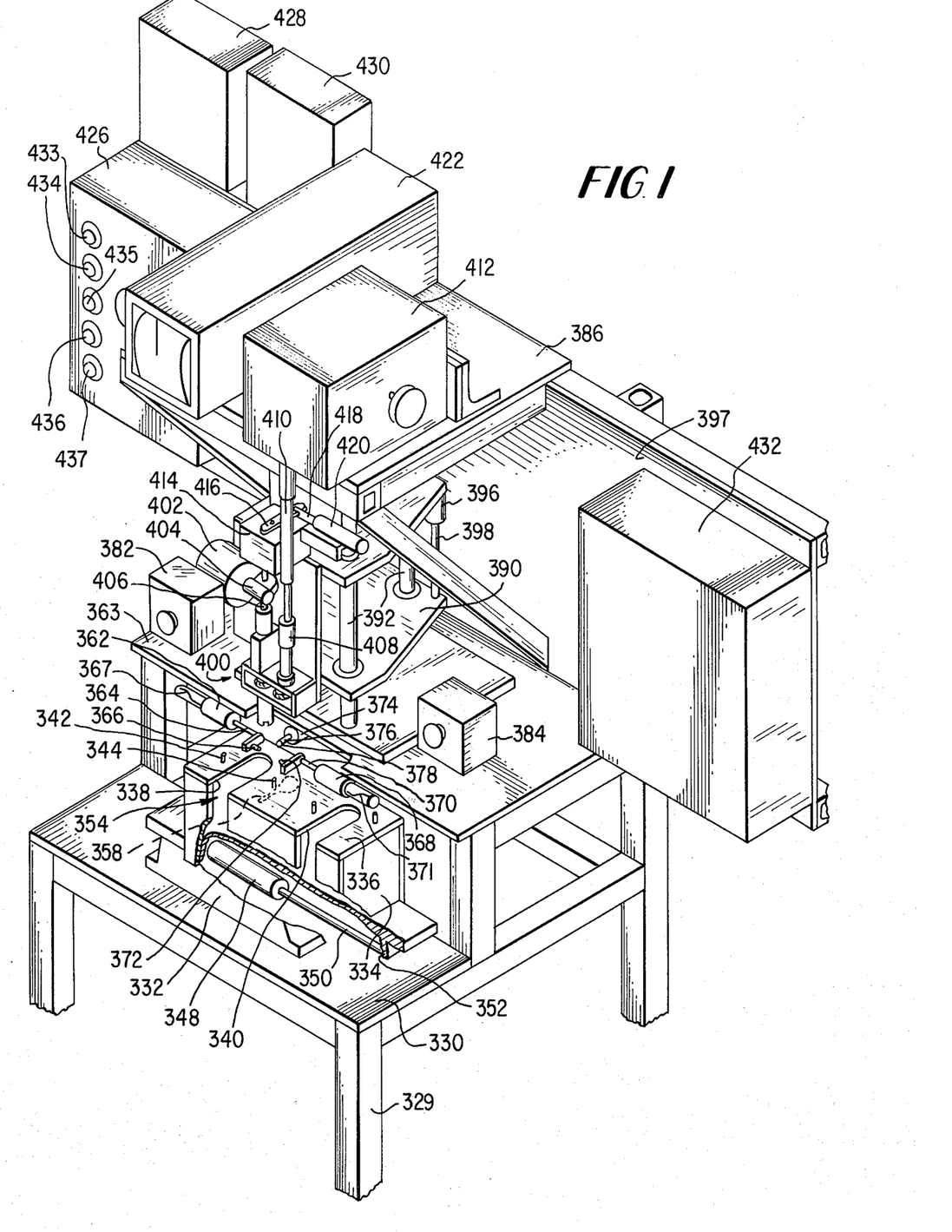
FIG. 1 is a perspective view of a calibration apparatus in accordance with the invention.
Figure 2:
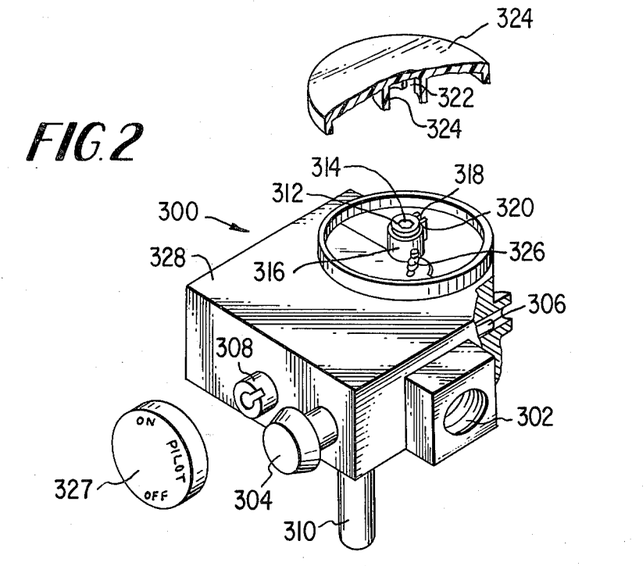
FIG. 2 is a perspective view, with parts broken away and other parts detached, of a thermostatic control which can be calibrated by the apparatus shown in FIG. 1.

The invention is embodied in a calibration apparatus, shown in FIG. 1, which is suitable for calibrating a thermostatic control, such as the thermostatic water heater gas control indicated generally at 300 in FIG. 2. The thermostatic gas control 300 is of the type having an inlet 302, a pilot outlet (not shown) and a main outlet (not shown). The control 300 has a magnetic safety valve opened by a reset push button 304 and held open by magnetic facilities operated by an electrical current through an electrical contact 306. The safety valve will automatically close if the electrical current is decreased, for example, by the cooling of a thermocouple generator upon extinguishment of a flame impinging on the thermocouple generator. The control 300 has a valve stem 308 controlling a main gas valve, such as a cock valve, which has an "off" position, a "pilot" position for passing gas from the inlet 302 to only the pilot outlet, and an "on" position for passing gas from the inlet to both the pilot outlet and a thermostatic valve to the main outlet. The thermostatic valve has a temperature sensing element 310 which operates a suitable valve mechanism (not shown) at a temperature selected by the rotative position of a shaft 312. The shaft 312 has a hex opening 314 formed therein for receiving a hex driver to rotate the shaft 312. A spring C-clamp or friction clutch member 316 surrounds the shaft 312 and frictionally grips the shaft 312. Ends 318 and 320 of the member 316 are formed outwardly so that they may be engaged within a slot 322 formed within a dial 324 which has a recess 326 adapted to be secured to the shaft 312 for rotating the member 316 and shaft 312 to select a temperature. A suitable stop 326 is provided for limiting rotative movement of dial 324. The control 300 has a relatively flat cover plate or surface 328. Thermostatic water heater gas controls of the type shown in FIG. 1 are disclosed in more detail in the prior art, such as U.S. Pat. No. 2,953,937 and U.S. Pat. No. 3,683,304.

During calibration by the calibration apparatus shown in FIG. 1, the dial 324 and a knob 327 for the valve stem 308 are removed from the control 300.

The calibration apparatus, as illustrated in FIG. 1, includes a frame 329 supporting a table top 330 upon which support 332 is mounted for slidably supporting a holding fixture or conveyor 334. The conveyor 334 has an upper supporting plate 336 having a pair of recesses 338 and 340 for receiving the temperature sensing elements 310 of a pair of thermostatic controls 300. The upper plate 336 is provided with respective pairs of pins 342 and 344 for aligning the thermostatic control on the plate 336. An air cylinder 348 is mounted on the support 332 and has a piston rod 350 secured an extension 352 of the conveyor 334 for moving or indexing the conveyor 334 to alternately position the supporting locations of the conveyor 334 within a calibration station indicated generally at 354. A temperature sensing element 358 is mounted on the table 330 to extend generally into the station 354 to sense the temperature of the air at the station 354.

An air cylinder device 362 mounted upon an upper plate 363 on the framework 329 has a rotating and projecting piston rod 364 which supports an electrical contact device 366 suitable for engaging the electrical contact 306 of the control 300. An air cylinder device 368 is mounted on the opposite side of the station 354 on the plate 363 and has a piston rod 370 supporting an engaging member 372 for engaging the reset push button 304 of the control 300. The air cylinder devices 362 and 368 are of the type which rotate the piston rods 364 and 370 through an angle of ninety degrees during a first portion of the advancement of the piston rods 364 and 370, such as by pins (not shown) on the piston rods 364 and 370 engaging respective camming slots 367 and 371 formed in the air cylinder devices 362 and 368. An air cylinder 374 is mounted on the underside of the plate 363 and has a piston rod 376 supporting a resilient tubular nipple or fitting 378 for engaging the inlet 302 of the control device 300 to form an airtight connection to the inlet 302.

Also mounted on the upper surface of plate 363 are a pair of push button switches 382 and 384, both of which must be operated by the hands of an operator simultaneously in order to initiate a cycle of the calibration apparatus. A carriage 390 is slidably mounted upon a plurality of verticle shafts 392, extending between the plate 363 and an upper plate 386 mounted upon the framework 329. An air cylinder 396 mounted on the framework 329 has a piston rod 398 attached to the carriage 390 for moving the carriage 390 vertically.

The carriage 390 supports a head member indicated generally at 400 for engaging the plate 328, the shaft 312 and the clutch spring 316 of the control 300. A reversible temperature set drive motor 402 connected by a suitable worm screw and gear arrangement 404 to a shaft 406 extending to the head 400 is mounted on the carriage 390. A second shaft 408 extends to the head 400 from a suitable spline joint 410 to connect the shaft 408 for rotation by a temperature adjusting servomotor 412. The shaft 406 is also connected to a clutch and limit sensing mechanism 414 including a rotatable arm 416 connected to a piston rod 418 extending from an air cylinder 420 which is mounted on the carriage 390.

The upper plate 386 also supports a temperature recording device 422. A back plate 397 supports an electric circuit cabinet 426, an amplifier circuit 428 for the temperature sensor 358, a servomotor power circuit 430 for controlling the temperature adjusting servomotor 412, and a pneumatic control cabinet 432. Indicator lamps 433, 434, 435, 436 and 437 are mounted in the electric circuit cabinet 426.

Figure 3:
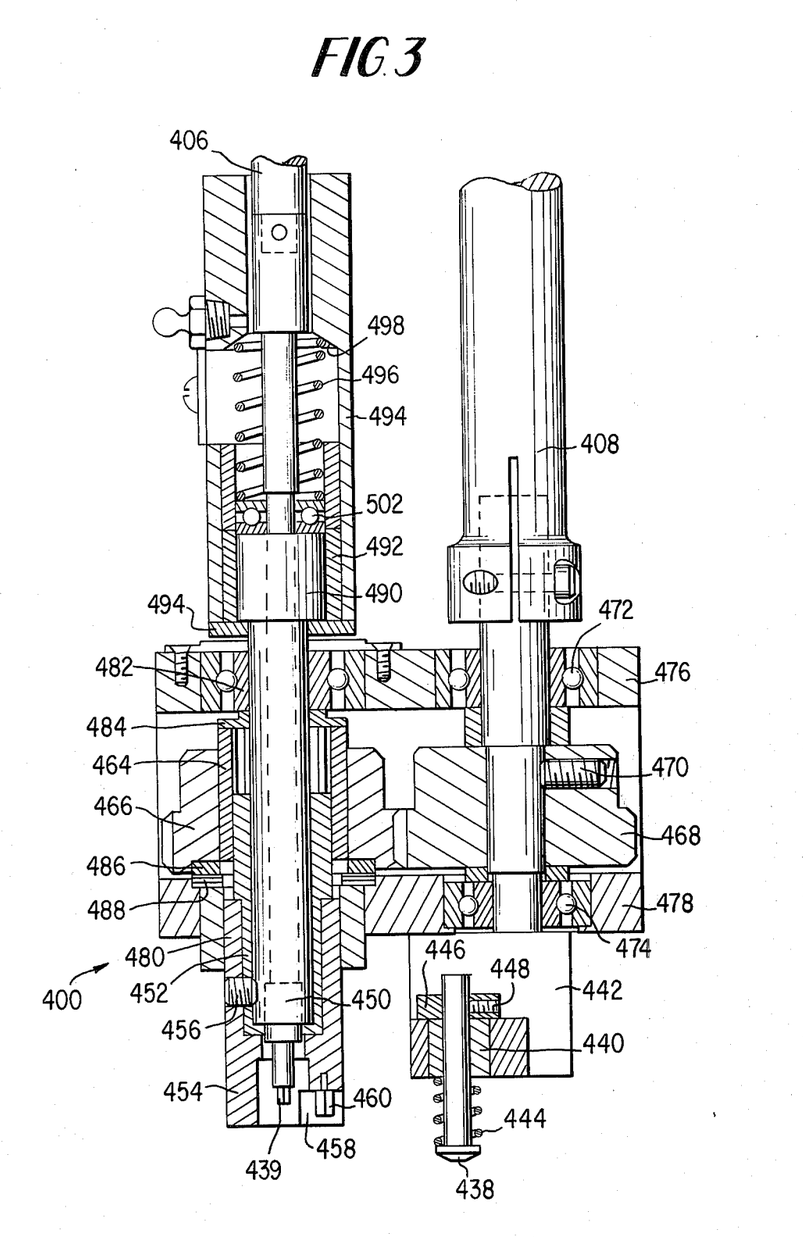
FIG. 3 is an elevational cross section view of a calibration head of the apparatus shown in FIG. 1.

Head 400 shown in FIG. 3 has a hex tip or drive portion 439 on the end of the shaft 406 for mating with the hex opening 314 in the shaft 312 of the control 300. A pin 438 slidably mounted by a bushing 440 in a block 442 extending from the carriage 390 (FIG. 1) is held down by a spring 444 for engaging the cover 328 of the control 300 to limit the down position of the carriage 390. A stop 446 secured by screw 448 to the pin 438 selects the depth of penetration of the hex tip 439 into the hex opening 314 to prevent any force being applied to the shaft 312. An inner tubular shaft 450, an inside spline member 452 and an outer tubular member 454 are secured together by a screw 456. The outer tubular member 454 has a notch 458 formed therein for surrounding the extending ends 318 and 320 of the spring clutch 316. A pin 460 extends within the notch 458 for extending between the extending ends 318 and 320 of the spring clutch 316 to hold the spring clutch 316 while the shaft 312 is rotated by the hex driver 439. The spline 452 is slidable within an outer spline 464 which is attached to a gear 466 meshing with a gear 468 secured by a screw 470 to the shaft 408 rotatably mounted within bearings 472 and 474 mounted within respective upper and lower support plates 476 and 478 secured to the carriage 390. The tubular member 454 is slidably and rotatably mounted within a bushing 480 in the lower plate 478 while the tubular shaft 450 is slidably and rotatably mounted within a bearing 482 in the upper plate 476. The gear 466 and the outer spline member 464 are rotatably mounted between spacers 484 and 486 between a thrust bearing 488 and the bearing 482. An upper end 490 of the tubular shaft 450 is slidably and rotably mounted within a bearing bushing 492 within an upper support member 494 on the carriage 390. A lower shoulder of the enlarged portion 490 is supported by cap member 494 on the lower end of the support member 494. A spring 496 is disposed between an upper shoulder 498 of the support member 494 and a thrust bearing 502 engaging the upper end of the enlarged portion 490 for exerting a downward force on the tubular shaft 450, the inner spline member 452 and the tubular member 454.

Figure 4:
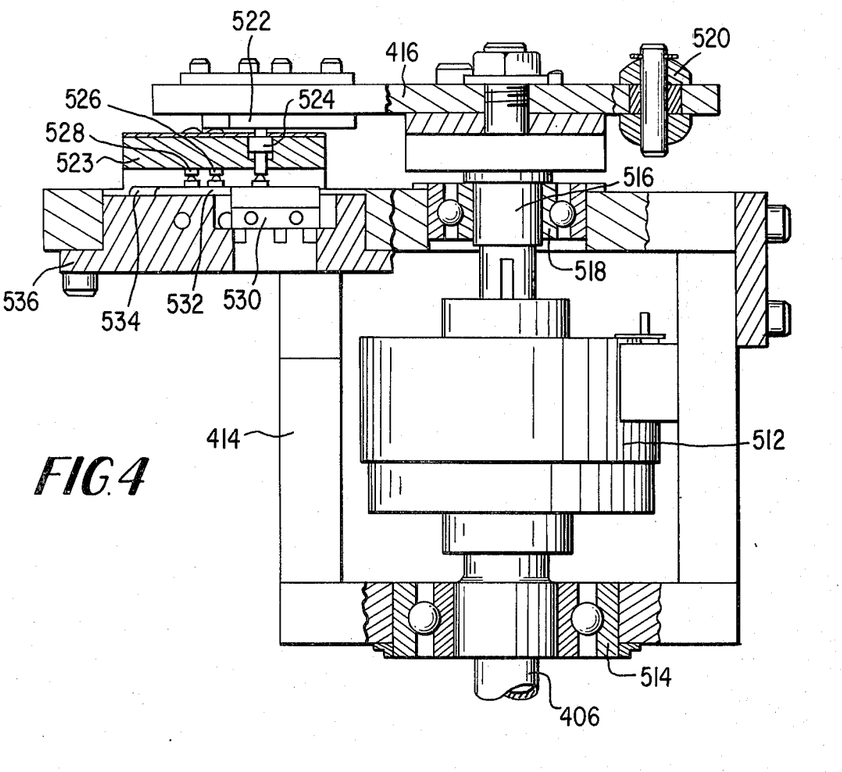
FIG. 4 is an elevational cross section view of a clutch and limit detecting mechanism of the calibration apparatus shown in FIG. 1.

Referring to FIG. 4 the clutch and switch housing 414 contains an electro-magnetic clutch 512 which has its driving input connected to the shaft 406 secured within a bearing 514 in the housing 414. A driven output shaft 516 rotatably extends from the clutch 512 through a bearing 518 in the housing 414. The upper end of the shaft 516 is attached to and supports the arm 416. One end of the arm 416 is pivotably attached to a suitable clevis 520 secured to the piston rod 418. The other end of the arm 416 has a cam 522 secured to the arm 416 by screws. A guide block 523 mounted on the housing 414 slidably supports cam follower pins 524, 526 and 528 for engaging respective switches 530, 532 and 534 mounted at selected positions in an extension 536 of the housing 414. The pins 524, 526 and 528 are positioned within the support 523 and the switches 535, 532 and 534 are positioned within the support 536 such that the cam 522 will operate the switch 530 when the arm 416 has rotated a first predetermined distance; the cam 522 will operate the switch 532 when the arm 416 has rotated a second predetermined distance beyond the first predetermined distance; and the cam 522 will operate the switch 534 when the arm 416 has rotated a third predetermined distance beyond the second predetermined distance.

Figure 5A:
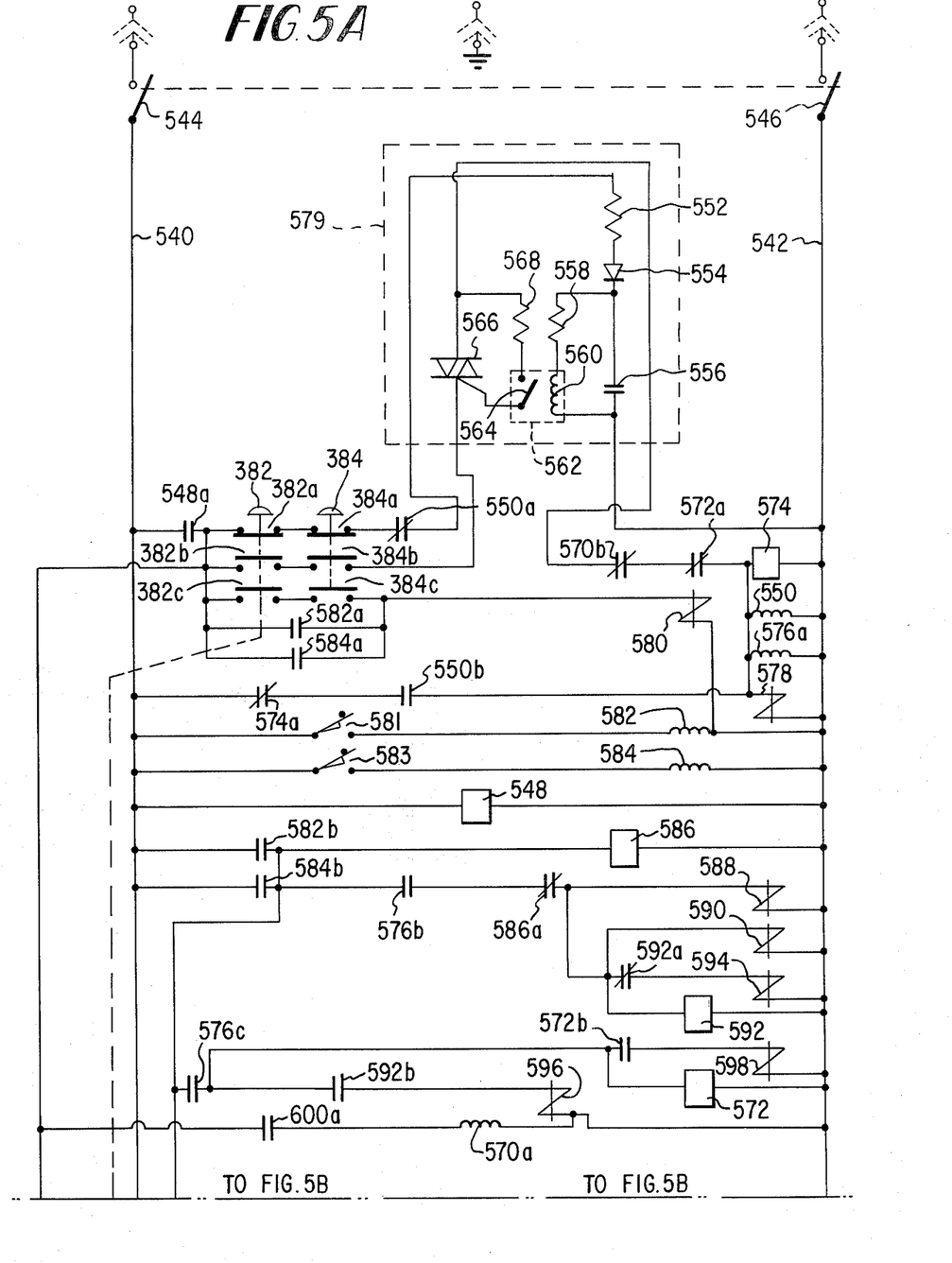
FIG. 5A is a first portion of a schematic of an electrical control circuit for the apparatus shown in FIG. 1.
Figure 5B:
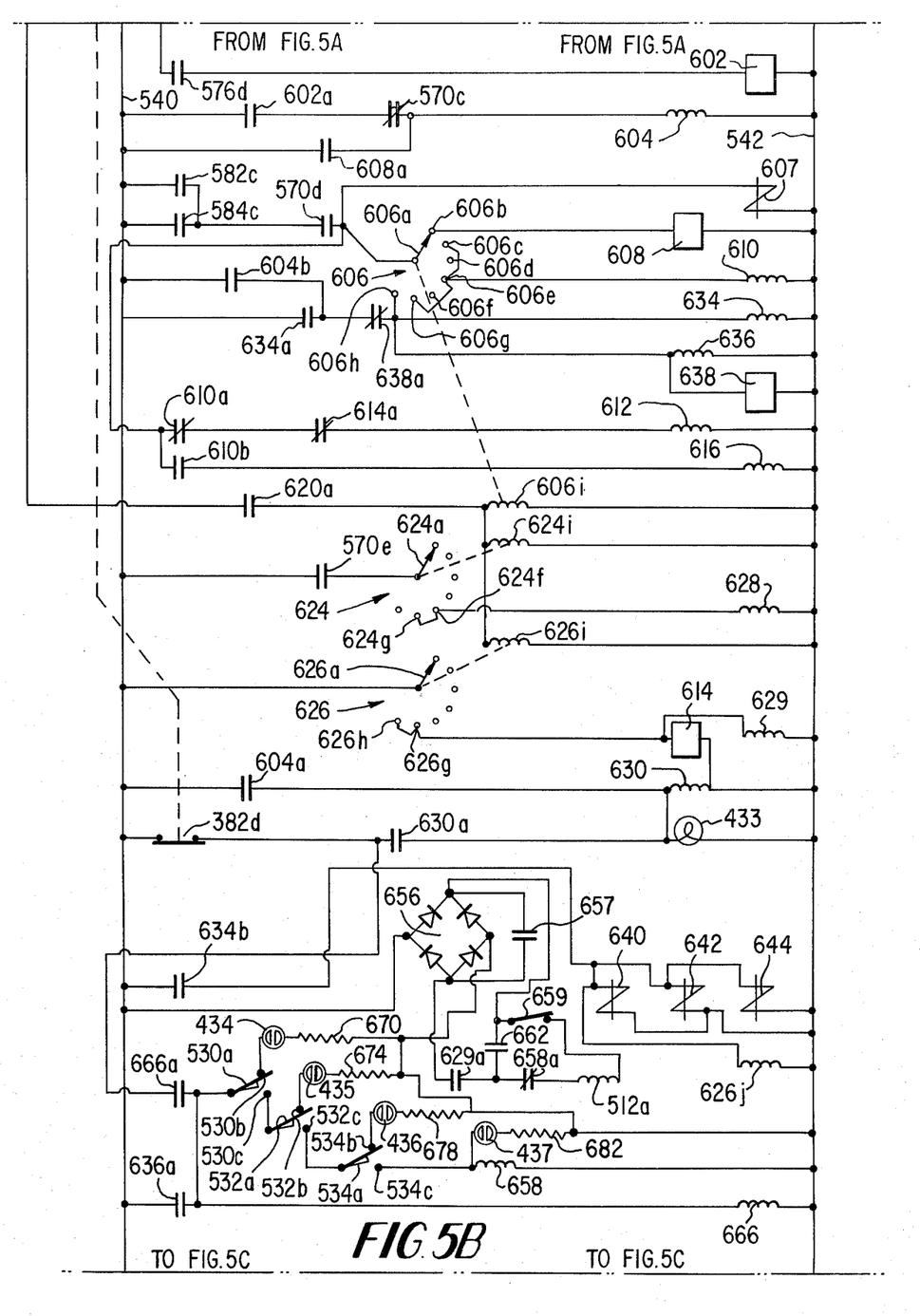
FIG. 5B is a second portion of the schematic of the electrical control circuit for the apparatus shown in FIG. 1.
Figure 5C:
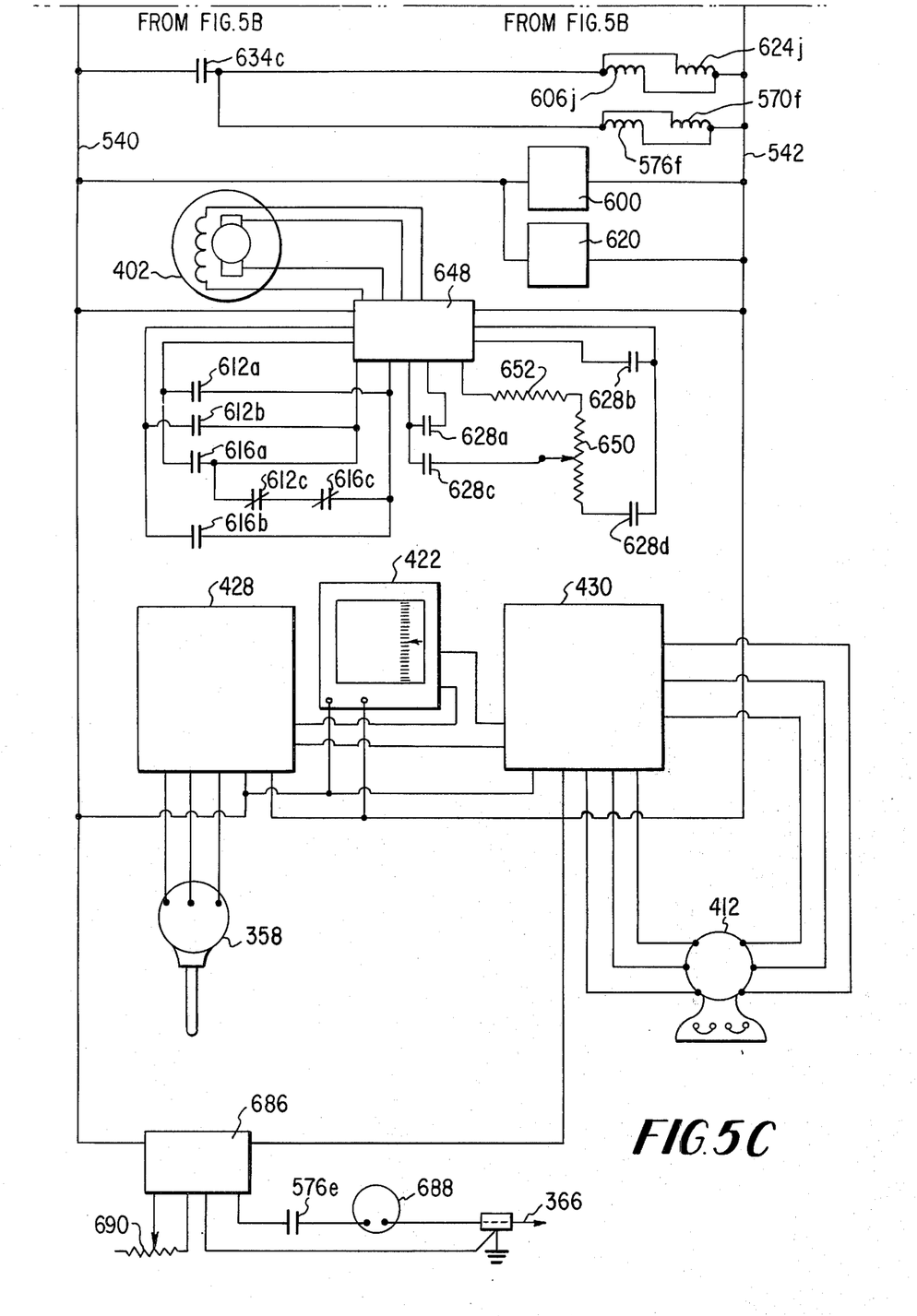
FIG. 5C is a third portion of the schematic of the electrical control circuit for the apparatus shown in FIG. 1.

The electrical control circuitry for the calibration apparatus, as illustrated in FIGS. 5A, 5B, and 5C includes a pair of power lines 540 and 542 connectable by respective contacts 544 and 546 of a switch across suitable connectors adapted to be connected to a suitable voltage source such as a 115 volt AC 60 hertz source. A time delay relay 548, connected across the power lines 540 and 542 and energizable to operate a predetermined duration after power is applied to lines 540 and 542, has normally open contacts 548a connected in series with normally closed contacts 382a of switch 382 and normally closed contacts 384a of switch 384, normally closed contacts 550a of a relay 550, a resistor 552, a diode 554, and a capacitor 556 across the power lines 540 and 542. A resistor 558 and a coil 560 of a reed relay or sealed contact relay 562 is connected across the capacitor 556. Normally open contacts 564 of the reed relay 562 are connected between a control electrode of a triac 566 and a resistor 568 in series with normally closed contacts 570b and 572a of a first flip-flop relay and a time delay relay 572, respectively, and a parallel combination of a time delay relay 574, the relay 550, a coil 576a of a second flip-flop relay, and a solenoid valve 578. The triac 566 is connected in series with normally open contacts 382b of switch 382, normally open contacts 384b of switch 384, the contacts 570b, the contacts 572a and the parallel combination of the time delay relay 574, the relay 550, the coil 576a, and the solenoid valve 568.

Time delay relay 574 is of the type which operates after a predetermined duration to open normally closed contacts 574a in series with normally opened contacts 550b and the parallel combination of the time delay relay 574, the relay 550, the coil 576a and the solenoid valve 578. The first flip-flop relay is of the type that opens contacts 570b and 570c, and closes contacts 570d and 570e when a coil 570a is energized. The contacts 570b and 570c remain open and the two contacts 570d and 570e remain closed until a coil 570f is energized. Similarly, the second flip-flop relay is of the type which closes contacts 576b, 576c, 576d and 576e when the coil 576a is energized. The contacts 576b, 576c, 576d and 576e remain closed, even though the coil 576a is deenergized, until a return coil 576f is energized to open the contacts 576b, 576c, 576d and 576e.

Normally open contacts 382c and 384c of the respective switches 382 and 384 are connected in series with a normally open solenoid valve 580 across the power lines 540 and 542. A conveyor left sensing switch 581 is connected in series with a relay 582 while a conveyor right sensing switch 583 is connected in series with a relay 584 across the power lines 540 and 542. The switches 581 and 583 are suitably mounted on the calibration apparatus shown in FIG. 1 to sense the respective extreme left and right positions of the conveyor 334. Contacts 582a and 584a are of the respective relays 582 and 584 are connected in parallel across the series contacts 382c and 384c for maintaining the solenoid valve 580 energized. Normally open contacts 582b and 582c of the respective relays 582 and 584 are connected in parallel to a series circuit through a time delay relay 586 across the power lines 540 and 542. The time delay relay 586 is the type which opens normally closed contacts 586a after a brief delay. A series circuit including the parallel combination of contacts 582b and 582c, and the contacts 576b and 586a, and a parallel combination of a solenoid valve 588, a solenoid valve 590, and a time delay relay 592 are connected across the power lines 540 and 542. A series combination of normally closed contacts 592a of the time delay relay 592 and a solenoid valve 594 is also connected in series with the contacts 586a and 576b and the parallel contacts 582b and 584b. Time delay relay 592 is selected to open the contacts 592a after a duration sufficient to cause the abutment 372 to depress the reset push button 304 on the control 300.

Contacts 576c are connected in series with a parallel combination of the contacts 582b and 584b, normally open contacts 592b of the time delay relay 592, and solenoid valve 596 across the power lines 540 and 542. The time delay relay 572 is connected in series with the contact 576c and the parallel contacts 582b and 584b across the power lines. Normally open contacts 572b of relay 572 in series with a solenoid valve 598 is connected across the time delay relay 572 which is designed to operate after operation of the valves 588, 590 and 594 and the engagement of the tubular fitting 378 with the inlet 302.

Contacts 600a, of a photo relay 600 which is connected across the power lines 540 and 542, are in series with the contacts 548a and the actuating coil 570a of the second flip-flop relay. Contacts 576d of the second flip-flop relay are connected in series with the parallel contacts 582b and 584b and a time delay relay 602 across the lines 540 and 542. Time delay relay 602, having contacts 602a in series with contacts 570c and an abort relay 604 across lines 540 and 542, has a lag in operation which is sufficiently long to allow adequate time for the valve 598 to open. Normally open contacts 582c and 584c are connected in parallel with each other to the power line 540 and in series with the contacts 570d to a moveable contact arm 606a of a first stepping switch indicated generally in 606. A solenoid valve 607 is connected between the junction of the contacts 570d to the contact arm 606a and the power line 542. A first contact 606b of the stepping switch 606 is connected in series with a time delay relay 608 to the power line 542. Normally open contacts 608a of the time delay relay 608 are connected in series with the abort relay 604 across lines 540 and 542 and in parallel with the contacts 602a and contacts 570c. Contacts 606c, 606e and 606g of the stepping switch 606 are connected in series with a relay coil 610 and the power line 542 while unconnected contacts 606d and 606f are interposed between the contacts 606c, 606e and 606g. Normally closed contact 610a of the relay 610 is connected in series with the parallel contacts 582c and 584c, the contacts 570d, contacts 614a of a time delay relay 614 and a motor forward relay 612. Normally open contacts 610b of the relay 610 are connected in series with the parallel contacts 582c and 584c, the contacts 570d, and a motor reverse relay 616 across the power lines 540 and 542. Contacts 620a, of a second photo relay 620 connected across the power lines 540 and 542, are connected in series with the contacts 548a and parallel stepping switch coil 606i of the stepping switch 606, stepping coil 624i of a stepping switch indicated generally at 624 and a stepping coil 626i of a stepping switch indicated generally at 626. Movable contact arm 624a of the stepping switch 624 is connected in series with the contacts 570e of the first flip-flop relay to the power line 540 while contacts 624f and 624g of the stepping switch 624 are connected in series with a slow motor relay 628 to power line 542. The contact arm 626a of the stepping switch 626 is connected to the power line 540 while the contacts 626g and 626h of the stepping switch 626 are both connected in series with a clutch relay 629 to the power line 542. The time delay 614 is connected in parallel with the clutch relay 629.

Normally open contacts 604a of the abort relay 604 are connected in series with a parallel relay 630 and lamp 433 across the power lines 540 and 542. The relay 630 has contacts 630a connected in series with reset contacts 382d of the push button switch 382 in a lockup arrangement for the relay 630 and the lamp 433.

Relays 634 and 636 and time delay 638 are connected in parallel between the contact 606h of the stepping switch 606 and power line 542. Normally open contacts 604b of the abort relay 604 and normally open contacts 634a of the relay 634 are connected in parallel with each other between the power line 540 and normally closed contacts 638a of the time delay relay 638 to the contact 606h. Normally open contacts 634b of the relay 634 are connected between the power line 540 and parallel solenoid valves 640, 642 and 644 and reset coil 626j of the stepping swtich 626 to the power line 542. Normally open contacts 634c of the relay 634 are connected to the parallel combination of the reset coil 606j of the stepping switch 606, the reset coil 624j of the stepping switch 624, the return coil 570f of the first flip-flop relay, and the return coil 576f of the second flip-flop relay. A motor control circuit 648 operatively connected to the motor 402 is connected between the power lines 540 and 542 and has an output connected by normally open contacts 612a of the relay 612 to a first input, and by normally open contacts 616a of the relay 616 to a second input with a second output connected by normally open contacts 612b of the relay 612 to the second input and by normally open contacts 616b of the relay 616 to the first input. Normally closed contacts 612c and 616c of the respective relays 612 and 616 are connected in shunt across the inputs of the motor control circuit 648. Normally open contacts 628a of the relay 628 are connected across first terminals of the motor control circuit 648 while normally open contacts 628b of the relay 628 are connected across second terminals of the control circuit 648. Normally open contacts 628c of the relay 628 are connected to the slider of a potentiometer 650 which is connected in series by a resistor 652 between a variable control terminal of the control circuit 648 and normally open contacts 628d of the relay 628 to one side of the contacts 628b. The motor control circuit 648 is any suitable motor control circuit for reversibly driving a motor at a variable speed, such as the motor control circuit sold as model No. W33 by Minarik Electric Company for driving a motor 402 such as model No. NSH-34RH115VDC sold by Bodine Electric Company.

A clutch drive circuit includes a DC rectifier circuit 656 across the power lines 540 and 542 with rectified DC across capacitor 657 applied to a series circuit through contacts 629a of the relay 629, contacts 658a of a relay 658, the coil 512a of the clutch 512 and a normally closed limit switch 659. The limit switch 659 is positioned to sense an over limit movement of the arm 416 (FIGS. 1 and 4). A capacitor 662 is connected across the clutch coil 512a to prevent burning of the contacts 629a during opening and closing.

Normally open contacts 636a of the relay 636 are connected in series with a relay 666 across the power lines 540 and 542. Normally open contacts 666a of the relay 666 are connected between the power line 540 and a contact arm 530a of the limit switch 530. Normally closed contact 530b of the switch 530 is connected in series with neon lamp 434 and a resistor 670 to the power line 542. Normally open contact 530c of the switch 530 is connected to a contact arm 532a of the switch 530 which has normally closed contact 530b connected in series with neon lamp 435 and a resistor 674 to the power line 542. Normally open contact 532c of the switch 532 is connected to a contact arm 534a of the switch 534 which has normally closed contact 534b connected in series with neon lamp 436 and a resistor 678 to the power line 542. Normally open contact 534c of the switch 534 is connected in series with neon lamp 437 and a resistor 682 to the power line 542. The relay 658 is connected in parallel to the lamp 437 and the resistor 682.

The resistance temperature detector amplifier circuit 428 is connected across the power lines 540 and 542 and by appropriate lines to the sensor assembly 358. Outputs of the amplifier circuit 428 are connected to the recorder 422 and the servomotor power circuit 430 which has outputs connected to the motor 412. The sensor 358 may be any suitable sensor for sensing temperatures such as Model No. 150-950-354-50 available from Robertshaw Controls Company, Aeronautic and Instrument Division, Anaheim, Calif. The resistance temperature detector amplifier circuit 428 may be any suitable amplifier circuit such as Model No. 123-B3-N3 from Robertshaw Controls Company, for producing electrical signals indicative of the temperature sensed by the sensor 358. The recorder 422 is an oscillograph for recording on paper the temperature that is sensed by the sensor 358 and may be any suitable type, such as Model No. 223-B1-N1 from Robertshaw Controls Company. The motor positioner circuit is any suitable circuit, such as Model No. 486-B1-X from Robertshaw Controls Company, which is responsive to the output of the resistance temperature amplifier circuit 428 and can control a motor. The motor 412 is any suitable motor such as Model No. 1026-4-60 from Leeds and Northrup Company.

A power supply circuit 686 having inputs connected to the power lines 540 and 542 has an output connected by contacts 576e of the first flip-flop relay through a millimeter 688 to the electrical contact 366. The power supply 686 has a potentiometer 690 for controlling the voltage or current through the output of the power supply.

Figure 6:
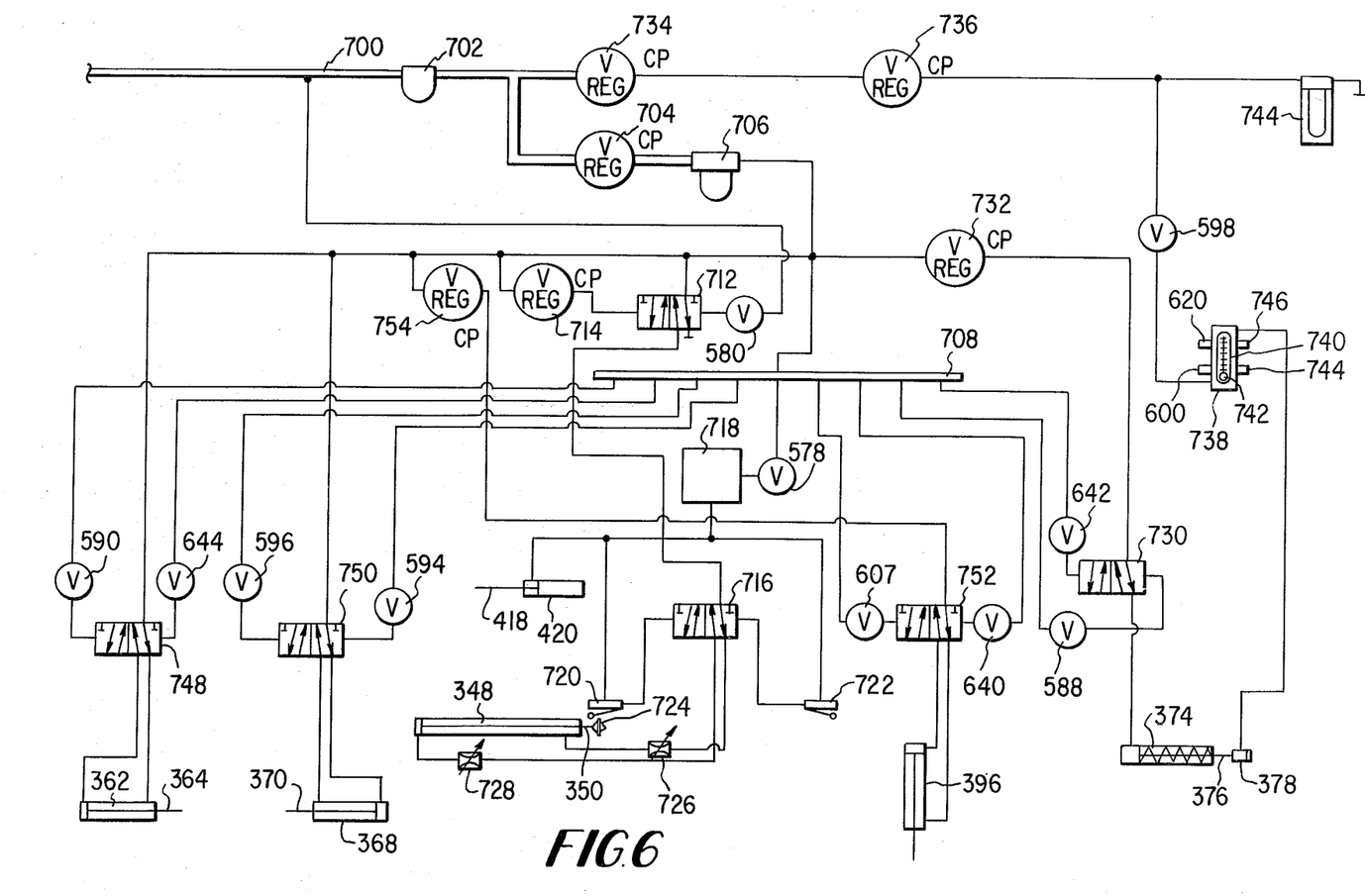
FIG. 6 is an illustration of the pneumatic control facilities for the apparatus shown in FIG. 1.

The air control circuit is shown in FIG. 6 and includes a supply line 700 which can be connected to a suitable air supply. The air supply line 700 is connected by a suitable filter 702, regulator valve 704 and a lubricator 706 to a supply manifold 708. The normally open valve 580 is connected between supply line 700 and one shift input of a four-way valve 712 which has its other shift input operated by a regulator valve 714 from the output of the lubricator 706. The inlet at the four-way valve 712 is connected to the output of the lubricator 706 while one output of the valve 712 is connected to the inlet of a four-way valve 716 and the other outlet of the valve 712 is plugged. The normally closed valve 578 is connected between the supply manifold 708 and an input of a logic air element 718 which is a differentiating device for producing a single pulse output of air which is applied to normally closed valves 720 and 722 connected to the respective shift inputs of the four-way valve 716. The valves 720 and 722 are positioned on the support 332 (FIG. 1) in a position to be engaged by an abutment 724 either on the conveyor 334 or else on the piston rod 350 as shown in FIG. 6 when the conveyor 334 is in its extreme left or right position respectively, the outlets of the four-way valve 716 are connected by respective variable restrictive control devices 726 and 728 to the retract and advance inputs of the conveyor indexing air cylinder 348. Also the output of the differentiating air unit 718 is connected to the retract input of the air cylinder 420. The air cylinder 420 has its advance input exhausted so that it is free to move under the force of the arm 416 in the absence of the air pulse from the differentiating unit 718.

A regulator valve 732 connects the output of the lubricator 706 to the inlet of a four-way valve 730 and the output of the four-way valve 730 is connected to the advance input of the air cylinder 374 which has a spring return. The normally closed valve 588 is connected between the manifold 708 and one shift input of the valve 730 while the normally closed valve 642 is connected between the manifold 708 and a second shift input of the four-way valve 730. Regulator valves 734 and 736 are connected serially from the output of the filter 702 to the inlet of the normally closed valve 598 which has its outlet connected to an input of a flow meter 738 communicating with the resilient fitting 378 on the end of the piston rod 376. The flow meter 738 is a suitable device such as a suitably shaped tube 740 containing a ball 742 which measures the rate of flow of fluid through the valve 598 and the fitting 378. The photo relays 600 and 620 are positioned to sense interruptions from respective beam light sources 744 and 746 caused by movement of the ball 742 within the flow meter 738. The position of the photo relay 600 is positioned to sense a low rate of flow corresponding to the flow which occurs through the pilot outlet of the control valve 300 (FIG. 2) while the photo meter 620 is positioned to sense the relatively high flow of air corresponding to the opening of the thermostatic valve to the main outlet of the flow control device 300 (FIG. 2). A manometer 744 is connected to the output of the regulator 736 to monitor the pressure which is applied to the inlet 302 of the control device 300.

The supply manifold 708 is connected by the respective normally closed valves 590 and 644 to respective shift inputs of a four-way valve 748 which has its inlet connected to the output of the lubricator 706 and its outputs connected to the respective advance and retract inputs of the air cylinder 362. Similarly, the supply manifold 708 is connected by the normally closed valves 594 and 596 to respective shift inputs of a four-way valve 750 which has its input connected to the output of the lubricator 706 and its outputs connected to respective advance and retract inputs of the air cylinder 368. The supply manifold 708 is connected by the normally closed valves 607 and 640 to respective shift inputs of a four-way valve 752 which has its input connected to the outlet of a regulator valve 754 having an inlet connected to the output of the lubricator 706. The outputs of the four-way valve 752 are connected to the respective advance and retract inputs of the carriage up-down air cylinder 396.

In operation, the apparatus of FIG. 1 calibrates the thermostatic control 300, shown in FIG. 2; i.e., sets the shaft 312 relative to the spring clutch 316 so that the thermostatic valve will close when the temperature sensed by the sensing element 310 increases to the temperature selected by the dial 324. Initially the valve stem 308 is set at the open position to connect both the pilot outlet and the thermostatic valve within the control device 300 to the inlet 302. The shaft 312 is rotated to its counterclockwise most position to close the thermostatic valve in the control 300. After insertion in the calibration apparatus, the reset push button 304 is depressed while current is applied through the contact 306 to open and maintain the safety valve of the control 300 in the open position. Air pressure is applied to the inlet 302. The flow of air into the inlet 302 corresponding to the flow of air to the pilot outlet of the thermostatic device is sensed to allow continuation of the operation of the calibration apparatus. The shaft 312 together with the clutch spring 316 are rotated clockwise until the ends 318 and 320 of the clutch spring 316 reach a position corresponding to the ambient temperature to which the temperature sensing element 310 is exposed. At that point the ends 318 and 320 of the clutch spring are held while the shaft 312 is rotated clockwise until the thermostatic valve of the control device 300 opens increasing the flow of air into the inlet 302. The increase in the flow of air into the inlet 302 is sensed causing the shaft 312 to be rotated in the opposite or the counterclockwise direction until the thermostatic valve closes causing the flow of air into the inlet 302 to decrease. A decrease in the flow of air into the inlet 302 results in the reversal of the rotation of the shaft 312 to the clockwise direction. The shaft 312 is thus rotated clockwise and returned counterclockwise between the open and closed positions of the thermostatic valve several times to insure that the elements of the thermostatic valve stabilize whereupon the speed of the rotation of the shaft 312 is reduced. Subsequently, the shaft 312 is rotated counterclockwise to the closing position of the thermostatic valve to complete the calibration and set the shaft 312 in its proper position relative to the spring clutch 316.

In the calibration apparatus of FIG. 1 the operator places the thermostatic control device 300 on the top plate 336 of the conveyor 334 on the aligning pins 342 and 344 with the temperature sensing element 310 extending into recess 338. The operator then presses both of the push button switches 382 and 384 simultaneously, causing the conveyor 334 to shift to the right as shown in FIG. 1, moving the thermostatic control 300 to the calibration station 354. The air cylinder 420 rotates the arm 416 to an initial position. The air cylinder 374 is operated to project the piston rod 376 and engage the resilient fitting 378 with the inlet 302 of the control device 300. The air cylinder 362 is operated to advance and rotate the piston rod 364 and engage the contact 366 with electrical contact 306 of the control device 300. Simultaneously the air cylinder 368 is operated to advance and rotate the piston rod 370 and to engage the abutment 372 with the reset push button 304 of the control device 300 to depress the reset push button 304 and open the safety valve in the control 300. Air pressure is applied to the inlet 302 of the control device 300 and is sensed to cause an operation of the air cylinder 396 to advance the piston rod 398 and lower the carriage 390 thus engaging the head 400 with the control device.

The temperature at the calibration station 354 is continuously sensed by the thermosensing element 358 connected to the amplifier circuit 428 which operates the servomotor power circuit 430 and the oscillograph 422 which continually records the temperature. The servomotor power circuit 430 operates the servomotor 412 to select the rotative position of the shaft 408 connected to the head 400 to a position in accordance with the temperature at the calibration station 354. The motor 402 is rotated to rotate the shaft 406 clockwise and counterclockwise to cause the head 400 to rotate the shaft 312 of the control 300. During the last counterclockwise rotation of the shaft 406 the clutch mechanism 414 is operated to cause the arm 416 to be rotated with the shaft 406 until the motor 402 is stopped by the closing of the thermostatic valve in the control device 300. The clutch and switch mechanism 414 is energized to operate the indicator lamps 434 and 435, 436 and 437 in accordance with the condition of the control 300. In particular, if the control device is acceptable the indicator lamp 436 is lit, indicating that the control device is between predetermined upper and lower limits. If the indicator lamp 435 is lit the device is not within the predetermined limits but can be modified or salvaged. If the lamp 434 is lit the device does not have an acceptable degree of temperature range between opening and closing of the thermostatic valve, and if the switch 437 is lit it indicates that the control device has too large a temperature range between the opening and closing of the thermostatic valve. The electrical control circuit 426 also provides for the automatic abortion of a calibration cycle in the event that the control device does not have sufficient pilot air flow or thermostatic valve air flow. The lamp 433 will be lit indicating the abort condition.

In the head 400, shown in FIG. 3, the head of the pin 438 engages the cover 328 on the thermostatic control 300, thus limiting the downward movement of the head 400 and the carriage 390. The rotative position of the hex driver 439 may not be the same as the hex opening 314 thus causing the hex driver 439 to engage the top of the shaft 312. When the shaft 406 is rotated by the motor 402, the hex driver 439 will eventually drop into the opening 314 thus allowing the shaft 406 to rotate the shaft 312. The shaft 408 having rotated to a position selected by the temperature at the calibration station positions the gear 468, the gear 466, the outer spline 466, the inner spline 452 and the tubular members 454 to a rotative position selected in accordance with the sensed ambient temperature. When the head 400 lowers engaging the head of the pin 438 with the cover 328, the tubular member 454 is allowed to raise the spline 452 and the tubular shaft 450 against the force of the spring 496. When the shaft 406 rotates the shaft 312 the clutch spring 316 rotates therewith until the ends 318 and 320 of the clutch spring 316 are aligned with the notch 458 allowing the tubular member 454 to lower inserting the pin 460 between the ends 318 and 320 of the clutch spring 316. Thereafter the rotation of the shaft 406 and the shaft 312 of the control 300 slips the shaft 312 relative to the clutch spring 316. The pin 460 engaging one of the ends 318 and 320 will tend to open the clutch spring 316 from the shaft 312 thus lessening the frictional engaging force of the clutch spring 316 with the shaft 312.

In the clutch and limit sensing mechanism 414 shown in FIG. 4, the clutch 512, when energized connects the shaft 406 to the shaft 516 thus rotating the arm 416 with the shaft 406. The rotation of the arm 416 causes the cam 522 to depress the pins 524, 526 and 528 to actuate switches 530, 534 and 536, respectively, in accordance with the degree of rotation of the arm 416. The positions of the switches 532 and 534 determine the respective upper and lower limits of the range of rotation of the shaft 312 between opening and closing of the thermostatic valve in the control 300.

Referring to FIGS. 5A, 5B and 5C, when the switch contacts 544 and 546 are closed connecting the power lines 540 and 542 to a power source, the time delay relay 548 is operated closing contacts 548a. Current through the contacts 548a, 382a, 384a and 550a, the resistor 552 and the diode 554 charges the capacitor 556 which produces a current through resistor 558 and coil 560 closing contacts 564 of reed relay 562 to render the triac 566 conductive. When the push button switches 382 and 384 are simultaneously operated, contacts 382b and 384b close to pass current through the traic 566, contacts 570b and 572a, the time delay relay 574, relay 550, coil 576a and solenoid valve 578. The charge on the capacitor 556 after a duration is discharged allowing the coil 560 to deenergize opening the reed relay contacts 564 to render the triac 566 nonconductive. The anti-tiedown circuit 579 prevents the operator from tying or taping down one of the switches 382 and 384 to free his hand for assembling units during a dangerous time when the conveyor 334 is being moved.

Operation of the solenoid valve 578 operates the differential unit 718, FIG. 6, to produce a pulse air output. The piston rod 350 of the indexing table air cylinder 348 is either retracted or extended to open one of the valves 722, thus allowing the pulse of air from the differential unit 718 to shift the four-way valve 716. Shifting of the four-way valve 716 reverses the connection between the outlets of the four-way valve 716 and the inlets of the air cylinder 348. Also operation of the push button switches 382 and 384 closes the contacts 382c and 384c which close normally open valve 580. With the valve 580 closed, the four-way valve 712 is allowed to be shifted by the air pressure from the regulator 714 connecting the air pressure form the lubricator 706 to the inlet of the four-way valve 716 to shift the indexing cylinder 348 and the conveyor 334. If the operator releases one of the push buttons 382 and 384 prior to completion of the shifting of the conveyor 334 the valve 580 opens causing the four-way valve 712 to shift back into a blocked condition stopping the operation of the indexing cylinder until the operator again presses both of the switches 382 and 384.

Operation of the relay 550 opens contacts 550a preventing further recharging of capacitor 556 while the relay 550a remains energized. Also relay 550 closes contacts 550b locking the relay 550, coil 576a and solenoid 578 until time delay relay 574 operates opening contacts 574a. Operation of the coil 576a closes contacts 576e applying voltage from the power supply 686 to the electrical contact 366.

When the indexing conveyor 334 reaches either its left-most or right-most position, one of the switches 581 or 583 is closed, operating a respective one of the relays 582 and 584. One of the contacts 582b or 584b is closed by operation of one of the relays 582 and 584 to operate time delay 586 which, after a duration, opens contacts 586a. The contacts 576b are closed by operation of the flip-flop relay coil 576a to operate valves 588, 590 and 594 after closing of the contacts 586a. Opening of the valve 588 shifts the four-way valve 730 to connect the output of regulator valve 732 to the advanve input of the air cylinder 374 extending the piston rod 376 to engage the fitting 378 to the inlet 302 of the control device 300. Operation of the solenoid valve 590 shifts the four-way valve 748 to apply air to the advance input of the air cylinder 362 which causes the rotation and advancement of the piston rod 364 to engage the electrical contact 366 with the contact 306 of the control 300. Operation of the solenoid valve 594 shifts the four-way valve 750 applying air from the outlet of the lubricator 706 to the advance input of the air cylinder 368 causing the rotation and advancement of the piston rod 370 to engage the abutment 372 with the reset push button 304 of the control 300 to open the safety valve within the control 300. Also when one of the contacts 582b and 584b closes, a signal is applied to the time delay relay 592 which, after a period of time, opens contacts 592a deenergizing the solenoid valve 594. Also operation of the time relay 592 closes contacts 592b which, when the contacts 576c are closed, causes the solenoid valve 596 to be energized. When the valve 596 is opened, the four-way valve 750 is shifted back, applying air from the outlet of the lubricator 706 to the retract input of the air cylinder 368, causing the piston rod 370 to retract and return to its initial position.

When one of the contacts 582b or 584b close current through contacts 576c, closed when coil 576a was energized, operates the time delay relay 572, which closes contacts 572b, energizing the solenoid valve 598 after the operation of the solenoid valves 588, 590, 594 and 596 to apply air through the flow meter 738 from the regulator valve 736 to the resilient fitting 378 and the inlet 302 of the control device 300. If the safety valve within the control device 300 has properly operated and the air flow to the pilot outlet is sufficient, the air flow through the flow meter 738 causes the ball 742 to rise between the light beam source 744 and the photo relay 600, causing the operation of the relay 600. Contacts 600a of the photo relay 600 are closed, operating the coil 570a to open contacts 570b, which with contacts 572a opened by operation of the time delay relay 572 prevent further operating of the time delay relay 574, relay 550, coil 576a and solenoid valve 578.

When one of the contacts 582b or 584b closes, current through contacts 576d of the second flip-flop relay energizes a time delay relay 602, which after a period of time closes contacts 602a. If the time delay relay 602 operates prior to operation of the photo relay 600 and the second flip-flop relay which opens contacts 602a, the abort relay 604 is operated closing contacts 604a to energize the relay 630 closing contacts 630a to illuminate lamp 433 and lock up the operation of the circuitry, indicating the malfunction or the failure of pilot air.

When the first flip-flop relay is operated after one of the contacts 582c or 584c have been closed, contacts 570d close, energizing the solenoid valve 607 causing the shifting of the four-way valve 752 connecting air from the regulator 754 to the advance input of the air cylinder 396 to advance the piston rod 398 lower the carrieage 390 to engage the head 400 with the control 300. Also closing of the contacts 570d applies current through contacts 610a and 614a to relay 612 which closes contacts 612a and 612b and opens contacts 612c operating the motor control circuit 648 to drive the motor 402 to rotate the shaft 406 to rotate the shaft 312 of the control 300 in a clockwise direction. When the thermostatic valve in the control device 300 opens, the increase in the flow of air through the flow meter 738 causes the ball 742 to rise between the beam light source 746 and the photo meter 620 operating the photo meter 620 to close the contacts 620a operating stepping switch advancing coils 606i, 624i and 626i.

Initially when the contacts 570d were closed, the time delay relay 608 was activated through the contact arm 606a and the contact 606b. In the event that the photo relay 620 does not operate to advance the stepping switch 606 within a predetermined time after the contacts 570d close, the contacts 608a are closed by the timing of the time delay relay 608 to energize the abort relay 604 aborting the calibration cycle.

When the stepping switch 606 steps to the second contact 606c, the relay 610 is operated which opens contacts 610a and closes contacts 610b to deenergize the relay 612 and energize the relay 616. Thus contacts 612a, 612b, 616c open, and the contacts 612c, 616a and 616b close causing the motor control circuit 648 to reverse the motor 402. The thermostatic valve of the control 300 again closes and the air flow through the air meter 738 reduces allowing the ball 742 to fall between the light source 746 and the photo relay 620 again closing the contacts 620a to operate the stepping switch coils 606i, 624c and 626i. The advancement of the stepping switch arm 606a to the contacts 606d deenergizes the relay 610 opening the contacts 610b and closing the contacts 610a to reverse the motor 402 in its forward direction again and rotate the shaft 612 of the control 300 in its clockwise direction. Operation of the relay 610 and the photo relay 620 continues in a similar manner stepping the switches 606, 624 and 626 to advance the contact arms 606a, 624a and 636a to respective contacts 606f, 624f and 626f. When the contact arm 624a of the stepping switch 624 reaches the contact 624f, the relay 628 is energized closing the contacts 628a, 628b, 628c and 628d to operate the motor control circuit 648 to slow down the speed of the motor 402.

With the motor 402 operating at its slow speed the shaft 320 of the control device 300 is rotated clockwise to open the thermostatic valve and step the stepping relays 606, 624 and 636. When the contact arm 626a engages the contact 626g, the relay 629 is energized closing contacts 629a energizing the clutch solenoid 512a to operate the clutch 512 and cause the arm 416 to rotate with the shaft 406. Also the time delay relay 614 is operated opening the contacts 614a which prevents a subsequent reversal of the motor 402 to the forward direction.

Subsequently the thermostatic valve in the control device 300 again closes operating the photo relay 620a to advance the stepping switches 606, 624 and 626. When the contact arm 606a engages the contact 606h the relays 634 and 636 and the time delay relay 638 are energized. The relay 634 operates the holding contact 634a through the contact 638a to hold relays 634 and 636 and the time delay relay 638 operated for a short duration until contacts 638a open. Contacts 634b and 634c of the relay 634 are operated energizing the solenoid valves 640, 642 and 644 along with the stepping switch resetting coils 606j, 624j and 626j and the return coils 570f and 576f of the respective first and second flip-flop relays. Operation of the solenoid valve 640 shifts the four-way valve 752 to apply the air from the regulator 754 to the retract input of the air cylinder 396 raising the piston rod 398 and the carriage 390. Operation of the solenoid valve 642 shifts the four-way valve 730 disconnecting the advance input of the air cylinder 374 to exhaust to allow the air cylinder 374 to retract disconnecting the resilient fitting 378 from the inlet 302 of the control device 300. Operation of the solenoid valve 644 shifts the four-way valve 748 switching the air pressure to the retract input of the air cylinder 362 causing the piston rod 364 and electrical contact 366 to retract and rotate to a position out of engagement with the control 300. Operation of the resetting coils 606j, 624j and 636j resets the respective stepping switches 606, 624 and 626. Operation of the flip-flop coils 570e and 576e closes contacts 570b, 570c and opens contacts 570d, 570e, 576b, 576c, 576d and 576e terminating the calibration cycle and resetting the circuit for a subsequent calibration cycle.

Operation of the relay 636 closes contacts 636a energizing the relay 666 which closes contact 666a applying signal to the contact arm 530a. In accordance with how far the arm 416 has been rotated and which of the switches 530, 532, and 534 have been closed, one of the lamps 434, 435, 436, and 437 will be lit indicating the condition of the control device and whether the thermostatic valve of the control device is operated in a range which is below, can be salvaged, is good or is too high. An operated lamp 433, 434, 435, 436 or 437 remains operated until switch 382 is again operated opening contacts 382d.

In the event that the range of the opening and closing of the thermostatic valve is too high, the closing of the switch 534a with the contacts 434c operates the relay 658 opening contacts 658a to deenergize the clutch 512a. Also the safety switch 659 will be opened in the event that the arm 416 rotates beyond its normal operating range.

Since many modifications, changes in detail and variations can be made to the described embodiment, all matter contained within the foregoing description and the drawings shall be interpreted as illustrative and not in a limiting sense.

What is claimed is:

1. An apparatus for calibrating a thermostatic control which has an energy flow control means, settable means responsive to an operating temperature for operating the energy flow control means, and means for selecting the settable temperature of the operating means, said apparatus comprising means for sensing a temperature to which the thermostatic control is exposed, means responsive to the temperature sensing means for adjusting the selecting means in accordance with the sensed temperature, means for moving the settable means to operate the energy flow control means, means sensing the operation of the energy flow control means for terminating the moving means to set the settable means, and means for detecting if the settable means is set between predetermined upper and lower limits.

2. An apparatus for calibrating a thermostatic control as claimed in claim 1 including visual indicating means response to the detecting means for indicating the condition of the thermostatic control.

3. An apparatus for calibrating a thermostatic control as claimed in claim 1 wherein the detecting means includes an arm movable with the moving means, camming means on the arm, and switch means for being operated by the camming means to detect the condition of the thermostatic control.

4. An apparatus for calibrating a thermostatic control which has an energy flow control means, settable means responsive to an operating temperature for operating the energy flow control means, and means for selecting the operating temperature of the settable means, the apparatus comprising a calibration station, means for sensing the temperature at the calibration station, means responsive to the temperature sensing means for adjusting the selecting means in accordance with the sensed temperature, means for moving the settable means to operate the energy flow control means, means sensing the operation of the energy flow control means for terminating the moving means to set the settable means, and means for conveying thermostatic controls to the calibration station, said conveying means including table means moveable between first and second positions, means for supporting and aligning the thermostatic control at two locations on said table, and means for alternately moving said table to the first and second positions.

5. An apparatus for calibrating a thermostatic control which has an energy flow control means, settable means responsive to an operating temperature for operating the energy flow control means, and means for selecting the operating temperature of the settable means, the apparatus comprising means for sensing a temperature to which the thermostatic control is exposed, means responsive to the temperature sensing means for adjusting the selecting means in accordance with the sensed temperature, means for moving the settable means to operate the energy flow control means, means for sensing the operation of the energy flow control means for terminating the moving means to set the settable means, an arm rotatable with the moving means, camming means on one end of the arm, switch means operable by the camming means for indicating the position of the arm, visual indicating means operated by the switch means for indicating the condition of the control device,
a table indexible between first and second positions,
means for supporting and aligning the thermostatic control in two locations on the indexible table, and
means to move the table alternately between the first and second positions to position the thermostatic control in the calibrating apparatus.

6. An apparatus for automatically calibrating a thermostatic control having a control device movable between controlling positions, temperature sensing means and a temperature adjustment shaft connected to move said control device in response to variations from a temperature corresponding to the position of the temperature adjustment shaft, and temperature setting means disposed in frictional engagement with the temperature adjustment shaft, said apparatus comprising:
temperature-to-motion transducer means adapted to sense ambient temperature and translate it to a driving motion,
calibration head means adapted to be angularly positioned by said driving motion and to engage said temperature setting means of the control to be calibrated,
means to drive said temperature adjusting shaft between the controlling positions of said control device,
means to determine when said control device reaches one of its controlling positions at which time the angular positioning of said calibration head is imparted to said temperature setting means thereby calibrating said control,
means for detecting if the temperature setting means is set between predetermined upper and lower limits, and
means for conveying thermostatic controls to the calibration apparatus.

7. An apparatus for calibrating a thermostatic gas control which has an inlet, pilot outlet, a main outlet, a main outlet, a safety valve between the inlet and both pilot and main outlets, a thermostatic valve between the safety valve and the main outlet, temperature sensing means, means responsive to the temperature sensing means for operating the thermostatic valve, and means including a rotatable shaft and a member frictionally gripping the rotatable shaft for selecting a temperature of operation of the operating means, said apparatus comprising
means for operating the safety valve,
means for applying air to the inlet,
means sensing an ambient temperature for engaging and holding the member in a position corresponding to the ambient temperature,
means for rotating the shaft relative to the member,
means disabled by sensing a first level of air flow to the inlet corresponding to pilot outlet flow for indicating a failure and for preventing further operation of the calibration apparatus, and
means sensing a second level of air flow to the inlet for terminating the rotating means to calibrate the thermostatic gas control.

8. An apparatus as claimed in claim 7 including
means for reversing the rotating means in clockwise and counterclockwise directions,
said terminating means including means responsive to a change in air flow to the inlet for operating the reversing means a plurality of times prior to terminating the rotating means,
means for detecting and for indicating a plurality of degrees of rotation,
clutch means connecting the rotating means to the detecting means, and
means, responsive to the reversing means operating just prior to the terminating means, for operating the clutch means.

9. An apparatus as claimed in claim 8 wherein the shaft has a hexagonal opening,
the rotating means includes a hexagonal driver for engaging the hexagonal opening,
the member has a projecting end,
the engaging and holding means includes a tubular member surrounding the driver, the tubular member having a notch for receiving the projecting member, and
there is included carriage means for moving the rotating means and the engaging and holding means into and out of engagement with the thermostatic gas control.

10. An apparatus as claimed in claim 9 wherein the carriage means includes means for abutting the thermostatic gas control and for holding the hexagonal driver out of engagement with the bottom of the hexagonal opening.

11. An apparatus as claimed in claim 9 wherein the member is a C-spring for gripping the shaft and both ends of the C-spring project from the shaft, and
the engaging and holding means includes a pin extending into the notch for extending between the projecting ends of the C-spring.

* * * * *